US00RE35890E

United States Patent [19]

So

[11] E Patent Number: Re. 35,890

[45] Reissued Date of Patent: Sep. 8, 1998

[54] OPTIMIZED OFFSET STRIP FIN FOR USE IN COMPACT HEAT EXCHANGERS

[75] Inventor: Allan K. So, Mississauga, Canada

[73] Assignee: Long Manufacturing Ltd., Canada

[21] Appl. No.: 988,405

[22] Filed: Nov. 30, 1992

Related U.S. Patent Documents

Reissue of:

[64] Patent No.: 5,107,922
Issued: Apr. 28, 1992
Appl. No.: 663,414
Filed: Mar. 1, 1991

[51] Int. Cl.[6] ..... F28F 13/12

[52] U.S. Cl. ..... 165/109.1; 165/154; 165/916

[58] Field of Search ..... 165/109.1, 154, 165/916

[56] References Cited

U.S. PATENT DOCUMENTS

| | | |
|---|---|---|
| 2,789,797 | 4/1957 | Simpelaar . |
| 2,990,163 | 6/1961 | Farrell . |
| 3,197,975 | 8/1965 | Boling . |
| 3,474,513 | 10/1969 | Allingham . |
| 3,521,707 | 7/1970 | Brown . |
| 3,732,921 | 5/1973 | Hilicki et al. . |
| 3,763,930 | 10/1973 | Frost . |
| 3,768,149 | 10/1973 | Swaney . |
| 3,831,247 | 8/1974 | Degroote . |
| 4,096,616 | 6/1978 | Coffinberry . |
| 4,282,927 | 8/1981 | Simmons . |
| 4,991,643 | 2/1991 | Price et al. . |

FOREIGN PATENT DOCUMENTS

| | | |
|---|---|---|
| 148452 | 3/1950 | Australia . |
| 1078993 | 11/1954 | France . |
| 1521595 | 4/1968 | France . |
| 939996 | 2/1956 | Germany . |
| 2322730 | 11/1974 | Germany . |
| 2913134 | 10/1979 | Germany . |
| 62-169995 | 7/1987 | Japan . |

OTHER PUBLICATIONS

Heat Transfer and Fluid Flow Analysis of Interrrupted–Wall Channels, By E.M. Sparrow et al. pp. 188–189, Journal of Heat Transfer vol. 101, Feb./1979.

An Analysis of the Effect of Plate Thickness on Laminar Flow and Heat Transfer etc., By S.V. Patankar et al., Int. J. Heat Transfer, vol. 24, pp. 1801–1810, 1981.

Heat–Transfer, Pressure Drop and Performance Relationships for In–line, Staggered, and Continuous Plate Heat Exchangers, By E.M. Sparrow et al., Int. J. Heat Transfer, vol. 22, pp. 1613–1625, Apr./1979.

*Primary Examiner*—Allen J. Flanigan
*Attorney, Agent, or Firm*—Gifford, Krass, Groh, Sprinkle, Patmore, Anderson & Citowski, P.C.

[57] ABSTRACT

An offset strip fin for use in compact automotive heat exchangers is disclosed. The offset strip fin has multiple transverse rows of corrugations extending in the axial direction wherein the corrugations in adjacent rows overlap in order that the oil boundary layer is continually re-started. The fin dimensions have been optimized in order to achieve superior ratio of heat transfer to pressure drop along the axial direction. In one aspect, [an] *a* compact concentric tube heat exchanger has an offset set strip tin located in an annular fluid flow passageway located between a pair of concentric tubes. The preferred range of lanced lengths is determined to be between 0.035" to 0.075" for periodically developed flow. Maintaining the lanced length in the regime of periodically developed flow is advantageous in that it gives a higher heat transfer coefficient than is achievable with fully developed flow. This also provides the added advantage that variations in the shape of the flow passages from the rectangular do not impact negatively on the heat transfer. *The corrugations have top portions and bottom portions of the same width. The height of the corrugations is greater than this width.*

15 Claims, 16 Drawing Sheets

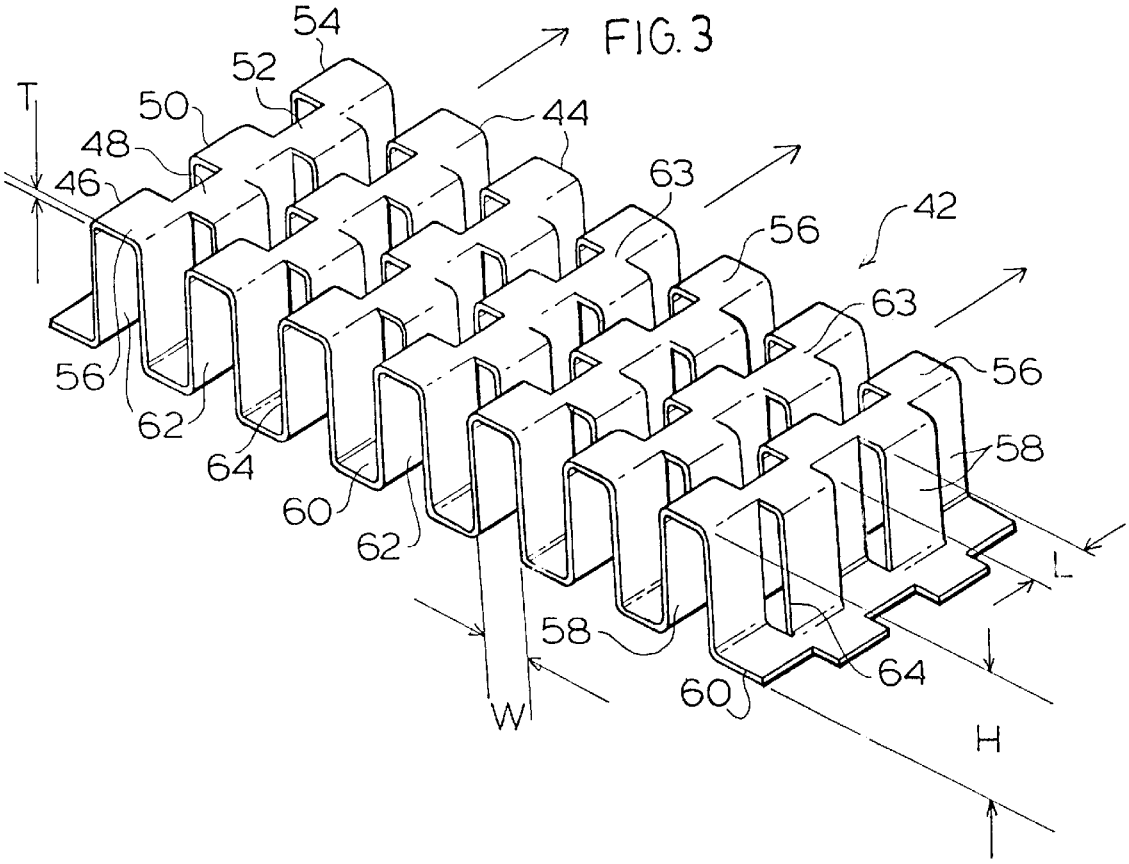
FIG. 4
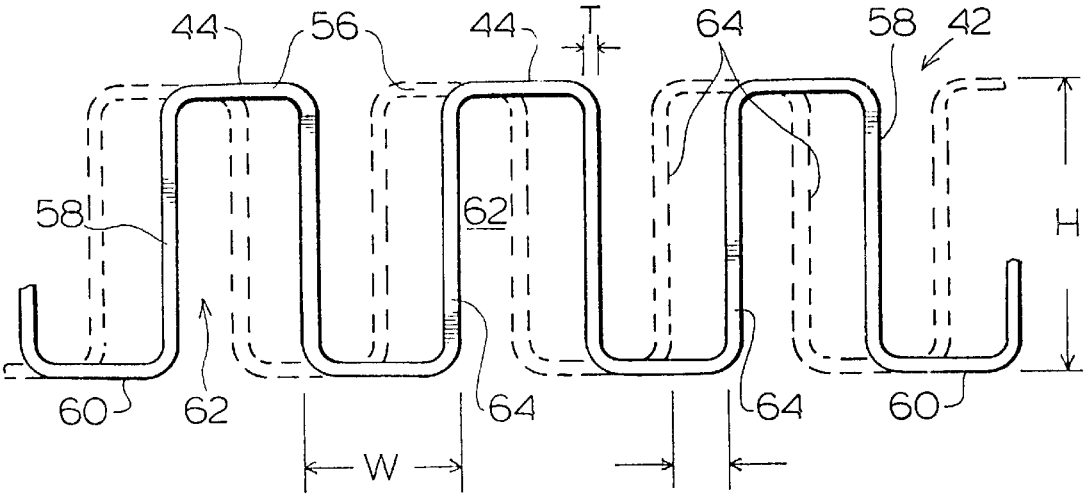

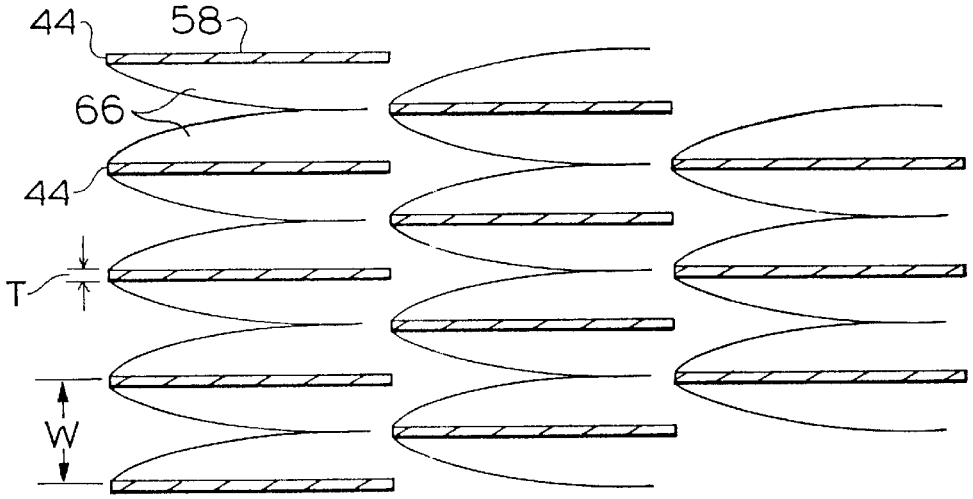
FIG. 7(a)
FIG. 7(b)
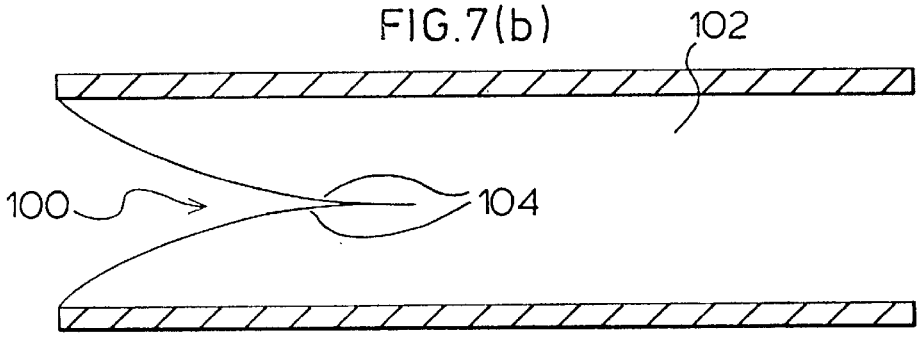
FIG. 8
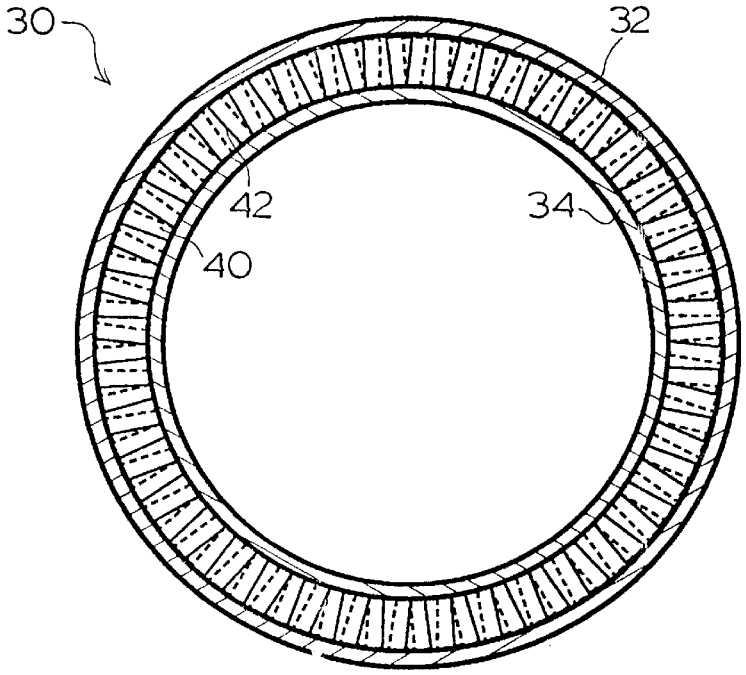

Nusselts Number
30.90
27.59
24.28
20.97
0.01
0.10
0.18
0.27
L(inches)
0.025
0.029
0.034
0.038
W (inches)

FIG. 21.
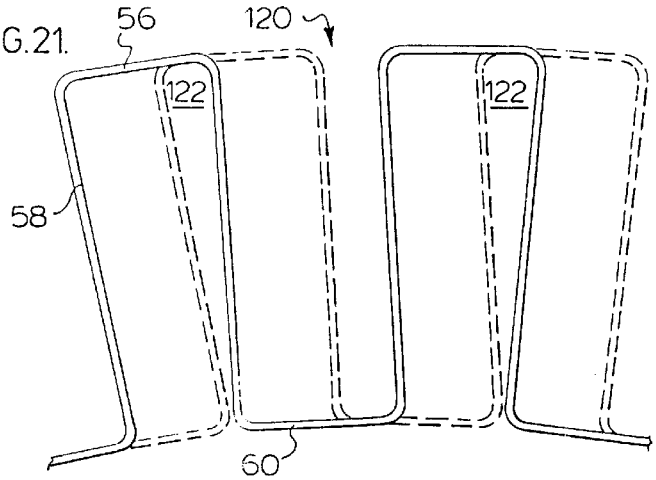
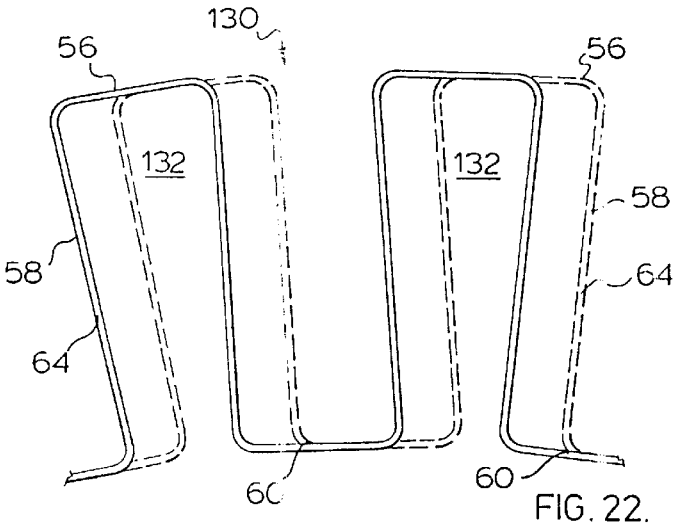
FIG. 22.
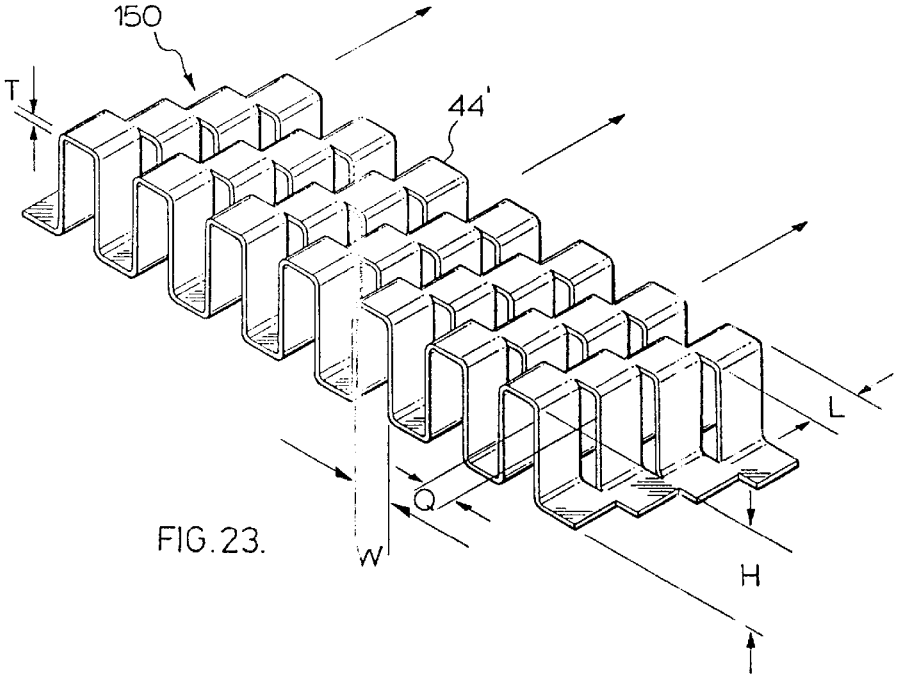
FIG. 23.

OPTIMIZED OFFSET STRIP FIN FOR USE IN COMPACT HEAT EXCHANGERS

Matter enclosed in heavy brackets [ ] appears in the original patent but forms no part of this reissue specification; matter printed in italics indicates the additions made by reissue.

FIELD OF THE INVENTION

The present invention relates to offset strip fins used in compact tube heat exchangers for use in automotive applications.

BACKGROUND OF THE INVENTION

Typical transmission and transaxle oil coolers employ tubular heat exchangers mounted in the outlet tank of the vehicle radiator. These heat exchangers include a cylindrical outer tube, an inner tube and a turbulizer placed in an annular passageway between the inner and outer tubes. Oil is admitted to the annular passageway via an inlet port located at one end of the tube whereupon it passes through the turbulizer and is cooled and exits via an outlet port located near the other end of the tube.

Conventional turbulizers (also referred to as turbulators) which have been used in tubular heat exchangers typically consist of sinusoidal convolutions or rectangular corrugations extending in rows axially along the length of the tubular heat exchanger. Adjacent rows in the flow or axial direction are displaced from one another by half a convolution thereby creating transverse rows of transversely aligned parallel slits or apertures. The function of this geometry is to create artificial turbulence since as the hot oil flows through the heat exchanger and impinges against the leading edge of the corrugations, the resulting excessive form drag splits the oil flow sideways as it advances to the next row of corrugations. This artificial turbulence is on the one hand desirable in that it results in enhanced heat transfer characteristics but is deleterious on the other hand in that it produces a significant contribution to the pressure drop along the axial length of the heat exchanger.

Current design trends in the automotive industry are towards more compact and aerodynamically efficient designs in an effort to increase fuel efficiency and accommodate new accessories such as pollution control devices and the like. This has led to a need to reduce the size of the radiator tank and hence a more compact concentric oil cooler is required. It has been found that down-sizing concentric oil coolers employing conventional turbulizers results in a substantial increase in the pressure drop along the axial length of the cooler. This higher pressure drop can produce deleterious effects on the oil pump thereby reducing the oil circulation rate in the cooling system.

Attempts have been made to minimize the oil pressure drop in the flow direction by eliminating the artificial turbulence. This is achieved by changing the turbulizer orientation so that the corrugations are transversely aligned in circumferential rows with apertures through the corrugations opening in the axial or flow direction thereby forming fluid flow passageways. The resulting structure does not create significant artificial turbulence and therefore cannot strictly be referred to as a turbulizer but is more appropriately termed a fin. The fin is comprised of a plurality of these circumferential rows (also referred to as strips) of corrugations which extend in the axial direction of the tubular heat exchanger. The walls of the passageways are periodically interrupted along the axial or flow direction, and corrugations in advent rows or strips have been overlapped by 50% in order to provide a continual restarting of the fluid boundary layers in order to achieve high heat transfer properties. Fins having a geometry wherein adjacent rows or strips of corrugations are offset from each other are typically referred to as offset strip fins (OSF). In this context, offset refers to the fact that adjacent transverse strips are offset from each other by a certain amount such that the corrugations in the adjacent rows overlap to produce the interrupted flow passageways.

Recent theoretical studies (Sparrow, E. M. et al., Transactions of the ASME, February 1977, p.4; and Sparrow, E. M. et al. J. Heat Mass Transfer, Vol. 22, p.1613) suggest that there is considerable potential for achieving increased heat transfer and lower pressure drop using the OSF with the appropriate fin dimensions.

SUMMARY OF THE INVENTION

The subject invention provides an offset strip fin having a geometry and dimensions in a range suitable to provide optimized heat transfer-to-pressure drop ratios when utilized in compact heat exchangers for cooling automotive based oils.

[In one aspect of the invention, an offset strip fin for use in a heat exchanger includes a plurality of transverse rows of corrugations where the rows are adjacent and extend in an axial direction. The corrugations have a flat top portion and a flat bottom portion where both the top and bottom portions have the same width. The corrugations have a height in a predetermined range and a width in a predetermined range, with the predetermined range of height being greater than the predetermined range of width. The corrugations in adjacent rows overlap with the overlapping corrugations defining periodically interrupted flow passageways in the axial direction. The lanced length of the corrugations in the axial direction is in a predetermined range.

In another aspect of the invention, a parallel plate heat exchanger is provided which includes a generally rectangular metal container with parallel top and bottom plates, one side having an entrance port and an opposed side having an exit port, and wherein the direction between the entrance and exit ports defines a longitudinal flow direction. An offset strip fin is disposed between the top and bottom plates wherein the fin is provided with a plurality of transverse rows of corrugations, the rows being adjacent and extending in the longitudinal direction. The corrugations have flat top portions and flat bottom portions, the top and bottom portions of the corrugations having the same width, the top portions being in thermal contact with the top plate and the bottom portions being in thermal contact with the bottom plate. The corrugations have a height in a predetermined range and a width in a predetermined range with the predetermined range of height being greater than the predetermined range of width. The corrugations in adjacent rows overlap to form periodically interrupted flow passageways in the longitudinal direction. The corrugations have a lanced lengths in the longitudinal direction in a predetermined range.]

[In a further] *According to one* aspect of the invention a *single pass* tubular heat exchanger is provided having an inner tube *with a circular cross-section* disposed within an outer tube *with a circular cross-section* with the space between the tubes defining [a] *an elongate, substantially straight* passageway extending along the axial direction of the tubes. *The inlet and outlet ports are located at opposite ends of the passageway.* An inlet port in flow communication with the passageway and an outlet port in flow communication with the passageway and spaced from the inlet port is provided. An offset strip fin is disposed in the passageway between the tubes wherein the fin is provided with a plurality of transverse rows of corrugations, the rows being adjacent and extending in the axial direction. The corrugations have a [substantially flat] top portion and a [substantially flat] bottom portion, the top and bottom portions having the same width, with the top portion in thermal contact with the inner surface of the outer tube and the bottom portion in thermal contact with the outer surface of the inner tube. The corrugations have a height in a predetermined range *from substantially 0.1 inch to 0.13 inch* and a width in a predetermined range with the [range of] height being greater than the [range of] width. The corrugations in adjacent rows overlap *but not to the point of crossover* to form periodically interrupted flow passageways in the axial direction with the lanced length of the corrugations in the axial direction being in a predetermined range.

In [still] another aspect of the invention a tubular heat exchanger for cooling automotive transaxle and transmission oil *at oil flow rates in the range from substantially 0.50 gpm to 3.5 gpm,* includes an outer tube having an inner diameter, and an inner tube concentrically disposed within the outer tube and having an outer diameter less than the inner diameter of the outer tube. The space between the tubes defines an annular flow passageway in the axial direction of the tubes and the ends of the tubes are sealed together around the circumference. The tubes define an inlet port in flow communication with the annular passageway and an outlet port also in flow communication with the passageway, the outlet port being spaced from the inlet port *and located at an opposite end of the tubes*. Also, an offset strip fin is circumferentially disposed in the annular passageway extending axially between the ends of the tubes, wherein the fin comprises a plurality of transverse rows of corrugations, the corrugations defining flow passageways in the axial direction. The corrugations have a height substantially equal to the difference between the inner radius or the outer tube and the outer radius of the inner tube *and in a range from substantially 0.1 inch to 0.130 inch*, the corrugations having a [flat] top portion in thermal contact with the inner surface of the outer tube and a [flat] bottom portion in thermal contact with the outer surface of the inner tube. The top and bottom portions of the corrugations have the same width, the width of the corrugations being in a predetermined range *and less than the height of the corrugations*. The top portions of adjacent corrugations are separated by a distance greater than the width of the corrugations and the bottom portions of adjacent corrugations are separated by a distance which is less than the width of the corrugations. Also, corrugations have a lanced length in the axial direction in a predetermined range. *The corrugations in adjacent rows overlap but not to the point of crossover.*

BRIEF DESCRIPTION OF THE DRAWINGS

Preferred and alternative embodiments of the invention will now be described by way of example only, with reference to the accompanying drawings, in which:

FIG. 3 is a perspective view of a portion of a fin in the flat or unwrapped form;

FIG. 4 is a front view of a fin showing the relative orientations of overlapping corrugations in two adjacent rows;

FIG. 7 illustrates a) developing hydrodynamic flow in an offset strip fin dimensioned so as to prevent reaching the fully developed flow condition for the given fluid flow rates and fluid properties, and b) fully developed flow in a rectangular passageway;

FIG. 8 is a sectional view of a wrapped fin which is on the verge of exhibiting crossover;

=oil flow of 0.79 GPM; Fin H=0.105"; and +=oil flow of 0.79 GPM Fin H=0.13".

Figure 16:
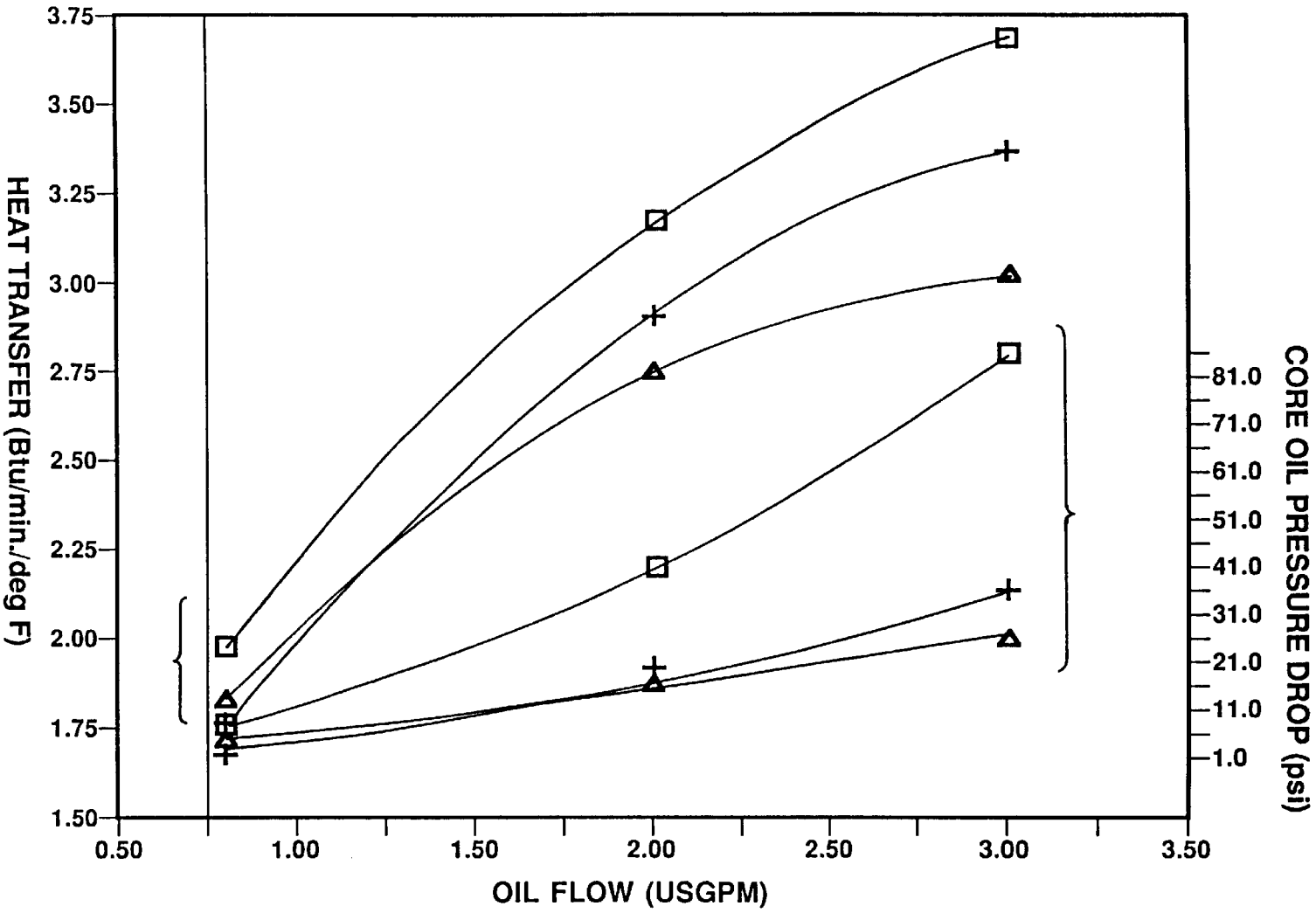

FIG. 16 compares the heat transfer and pressure drop characteristics for two coolers of identical volume employing conventional turbulizers of differing convolutions per inch (cpi) with the heat transfer and pressure drop characteristic of a cooler with a lower volume and which utilizes an LPD fin, where □=conventional turbulizer with 5 cpi, with cooler dimensions being 1.0" dia., length being 12.8" c/c; +=conventional turbulizer with 3 cpi, cooler dimensions being 1.0" dia., length being 12.8" c/c; Δ=LPD, 0.75" dia., length being 12.8" c/c; and L=0.044", H=0.1" and W=0.03".

Figure 17:
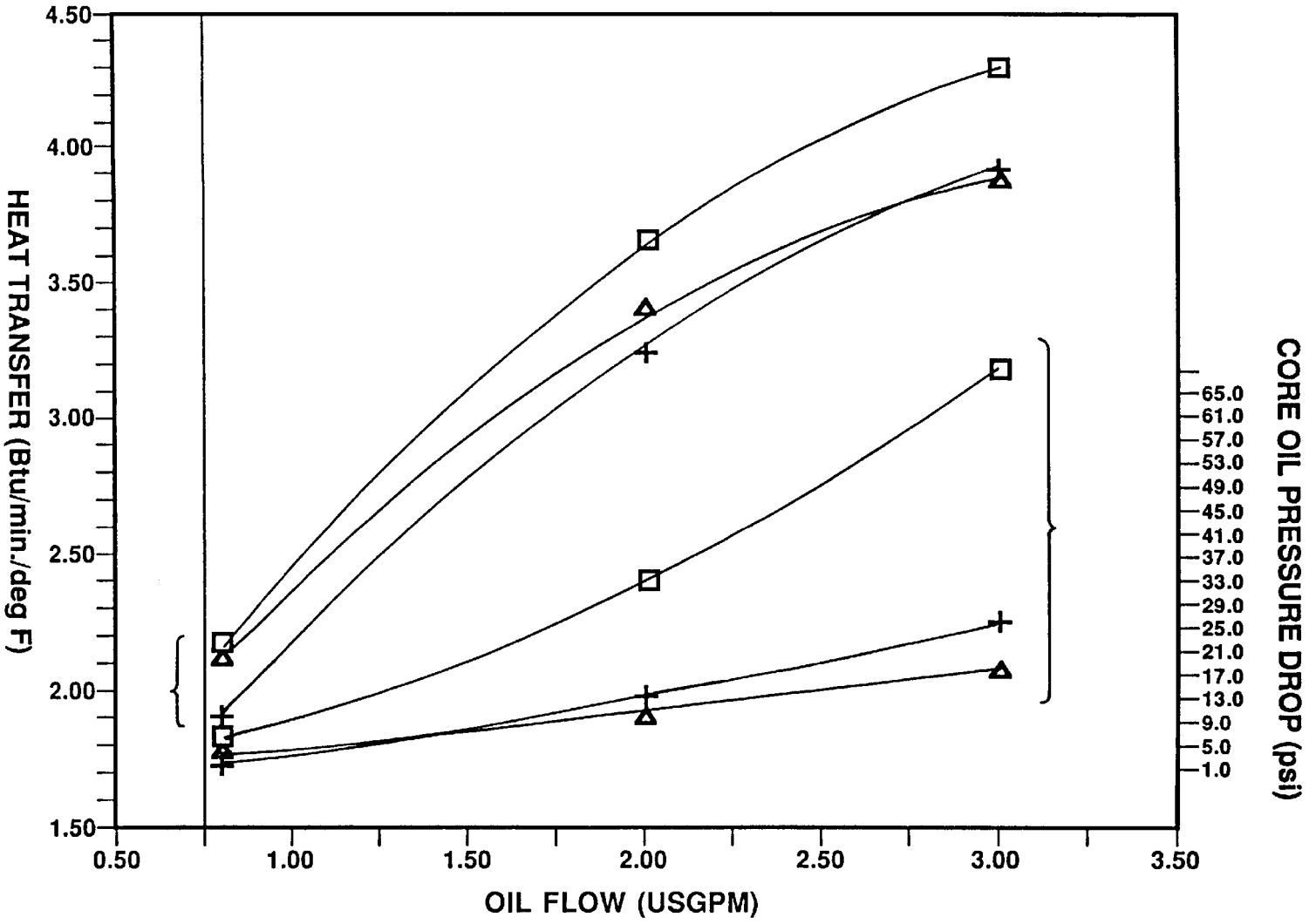

FIG. 17 is the same as FIG. 16 but with different cooler dimensions and different LPD fin dimensions; where= conventional turbulizer, 5 cpi, with cooler dimensions being 1.25" dia., length being 12.8" c/c+=conventional turbulizer, 3 cpi, with cooler dimensions being 1.25" dia. length being 12.8" c/c; Δ=LPD, 1.0" dia., length being 12.8" c/c; and L=0.044", H=0.1" and W=0.03".

Figure 18:
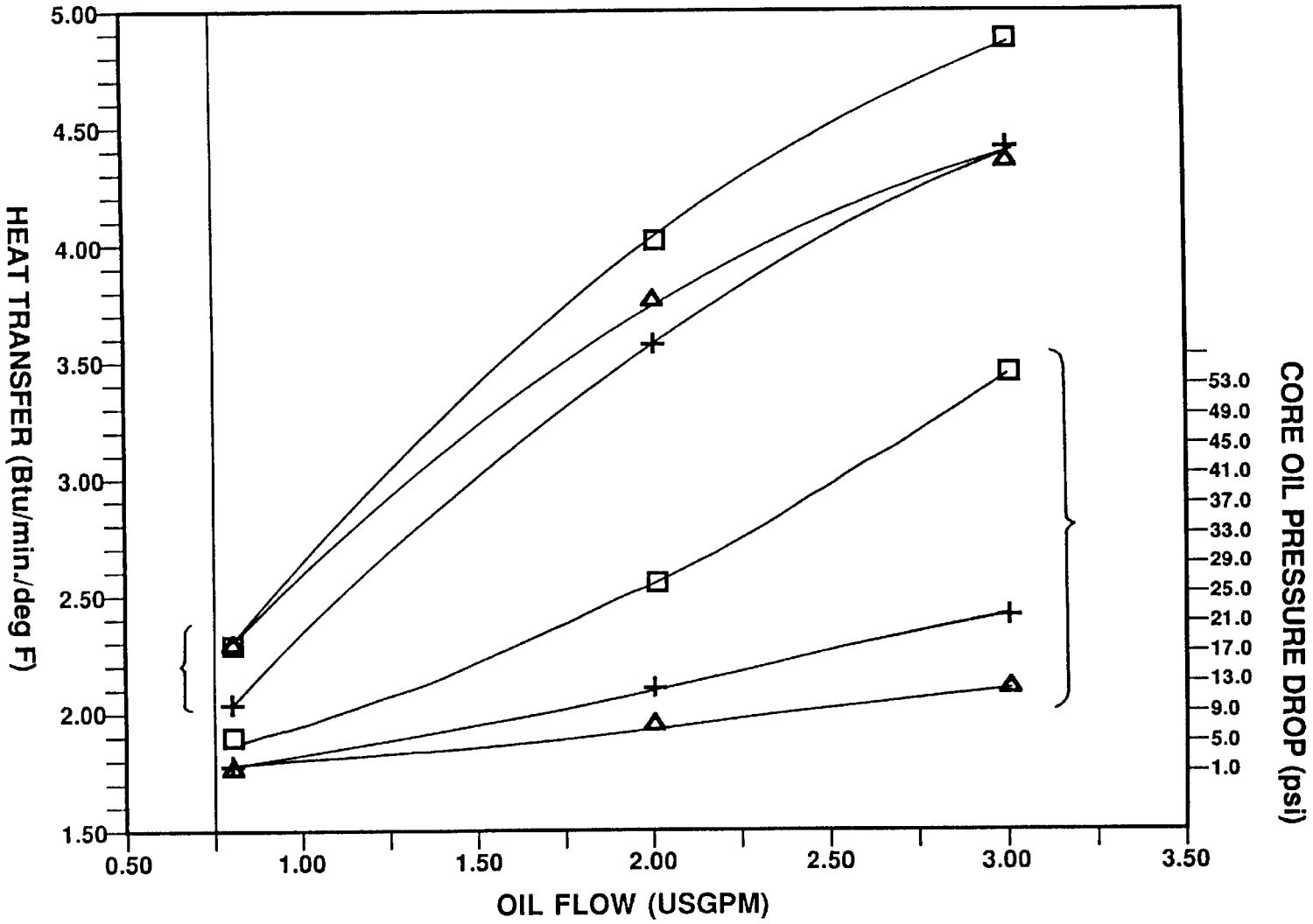

FIG. 18 is the same as FIG. 16 but again with different cooler dimensions and different LPD fin dimensions; where □=conventional turbulizer, 5 cpi, with cooler dimensions being 1.5" dia., length being 12.8" c/c; +=conventional turbulizer with 3 cpi, with cooler dimensions being 1.5" dia., length being 12.8" c/c; Δ=LPD, 1.25" dia., length being 12.8" c/c; and L=0.044", H=0.1" and W=0.035".

Figure 19:
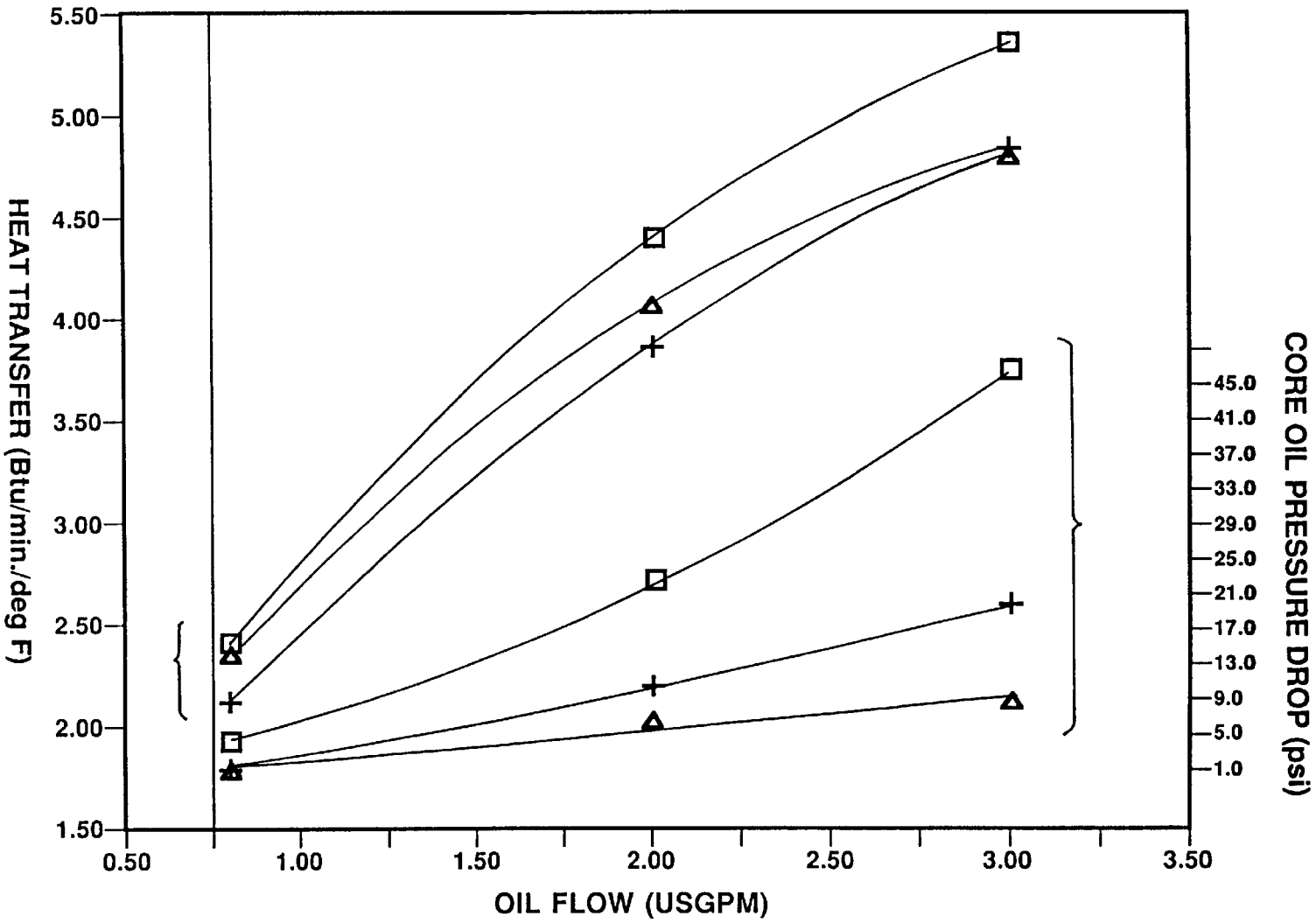

FIG. 19 is similar to FIG. 16 but with still different cooler dimensions and different LPD fin dimensions; where □=conventional turbulizer with 5 cpi, with cooler dimensions being 1.75" dia., length being 12.8" c/c; +=conventional turbulizer with 3 cpi, with cooler dimensions being 1.75" dia., length being 12.8" c/c; Δ=LPD, 1.5" dia., length being 12.8" c/c; and L=0.044", H=0.1" and W=0.038".

Figure 20:
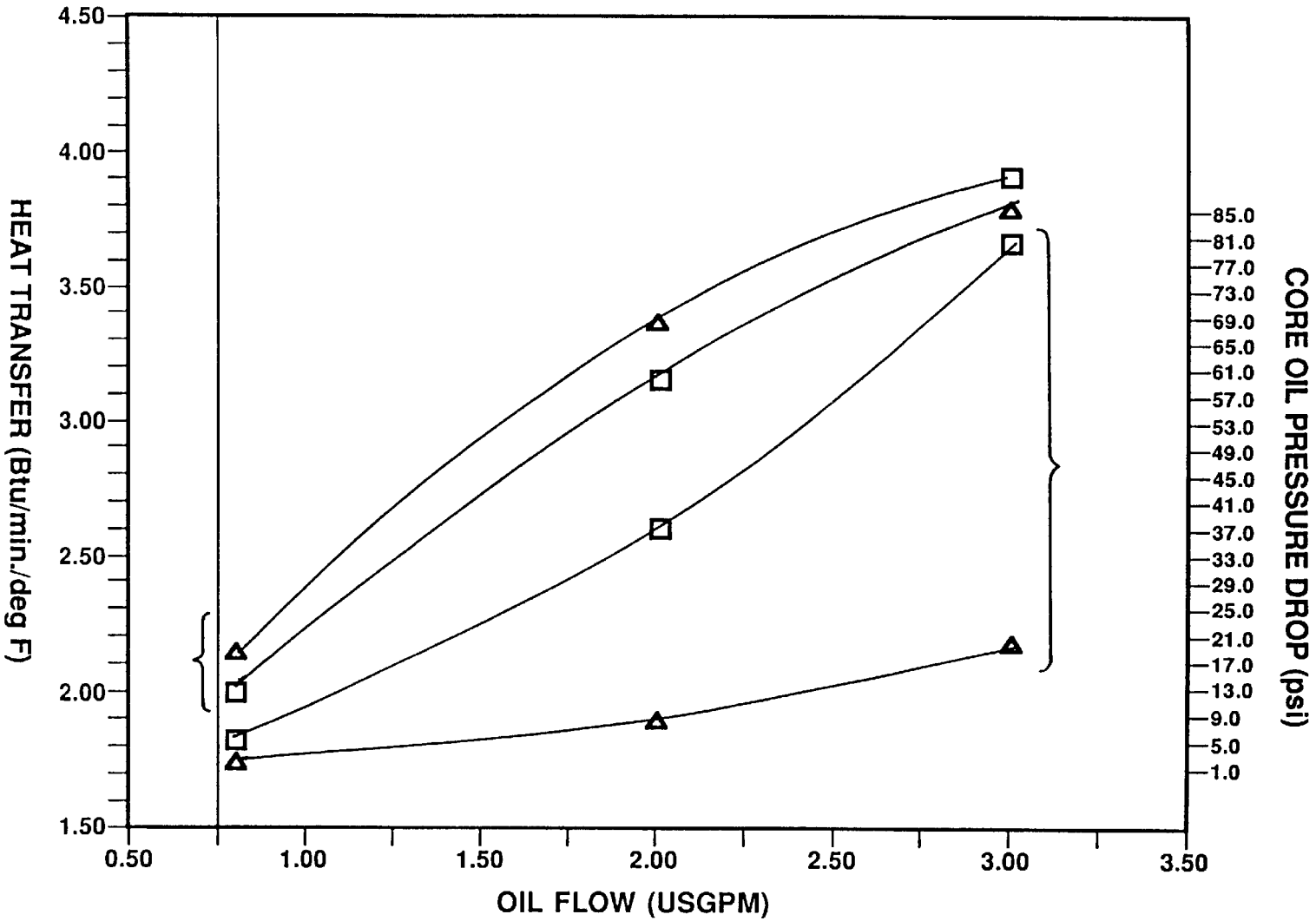
Figure 24:
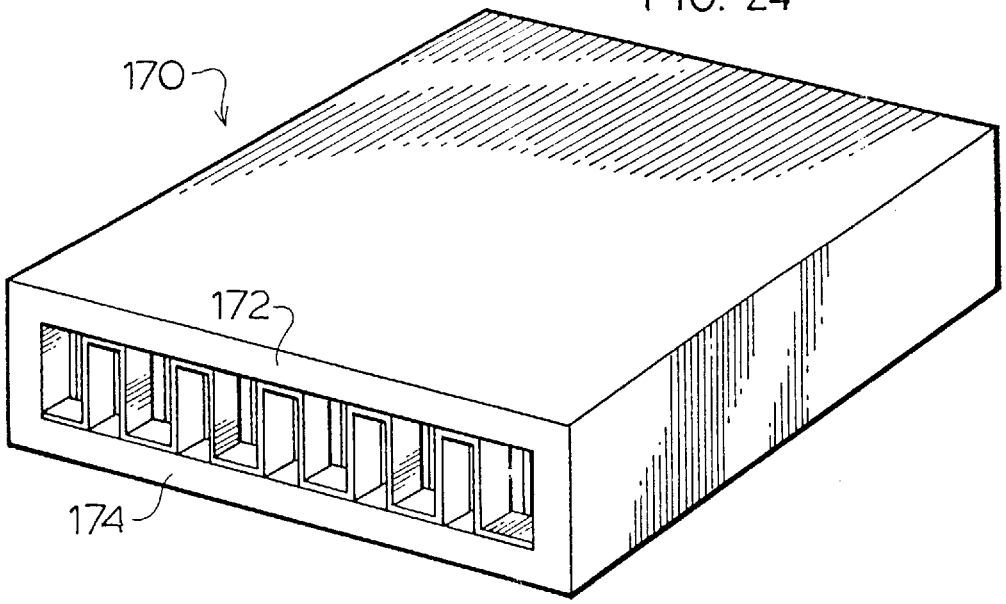

FIG. 20 compares the heat transfer and pressure drop characteristics for two concentric coolers both having the same volume but wherein one utilizes a conventional turbulizer where □=5 cpi (1.0" dia., 12.8" c/c) and the other an LPD fin Δ=LPD (1.0" dia., length being 12.8" c/c; and L=0.044", H=0.1" and W=0.03" [and the other an LPD fin];

FIG. 21 is a partial sectional view of an alternative embodiment of an LPD fin illustrating two adjacent rows of corrugations of a fin as they would appear in the wrapped form wherein the fin exhibits less than 50% offset in the flat form;

FIG. 22 illustrates another embodiment of an LPD fin similar to FIG. 21 exhibiting more than 50% offset in the flat form;

FIG. 23 is a perspective view of yet another alternative embodiment of an LPD fin in which adjacent rows of corrugations are offset by a constant amount in the axial direction; and FIG. 24 illustrates a perspective view of a flat plate heat exchanger utilizing the LPD fin of the subject invention.

DETAILED DESCRIPTION OF THE PREFERRED EMBODIMENT

The geometry of the preferred embodiment of the offset strip fin and concentric heat exchanger of the subject invention will be described first followed by a discussion of the preferred range of the various fin dimensions and the experimental results from which these dimensions have been deduced. Reference will be made to the Figures wherein like numerals [refers] *refer* to like parts.

Figure 1:
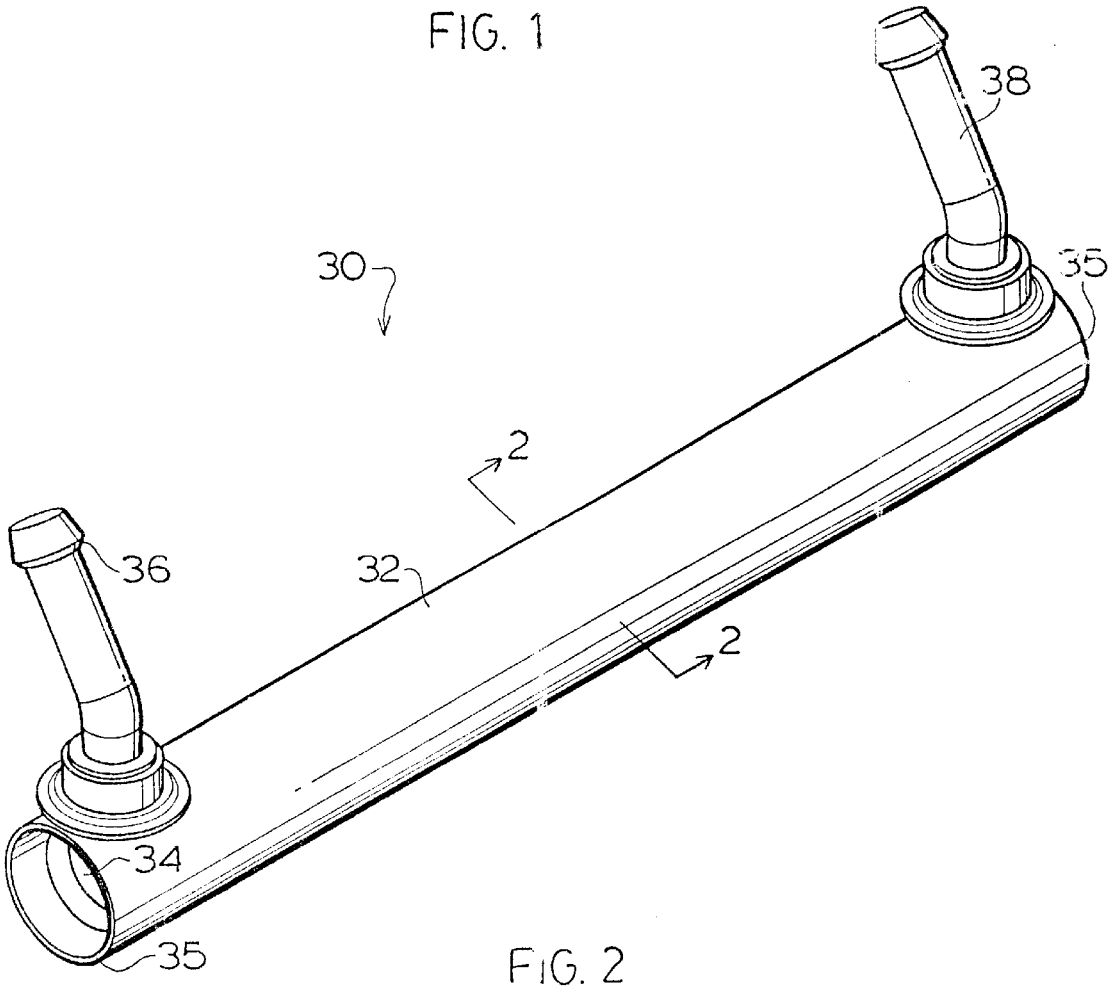
FIG. 1 is a perspective view of a preferred embodiment of a concentric heat exchanger according to the present invention.

Referring first to FIG. 1, a concentric tube heat exchanger 30 embodying the subject invention includes an outer cylindrical tube 32, an inner cylindrical tube 34, an oil inlet port 36 located adjacent one end of tube 32 and an oil outlet port 38 spaced from inlet port 36 and adjacent the other end of tube 32.

Figure 2:
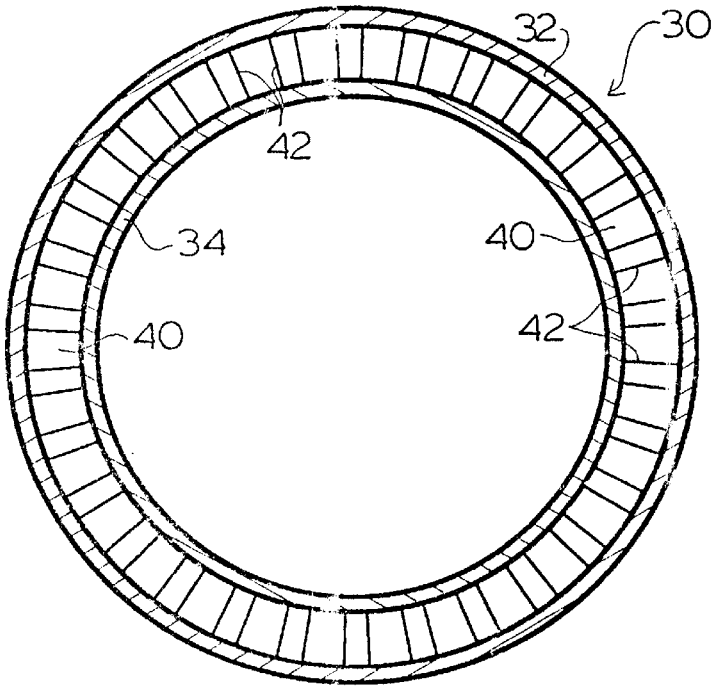
FIG. 2 is a sectional view of the heat exchanger of FIG. 1 taken along the lines 2—2.

FIG. 2 illustrates a cross sectional view of heat exchanger 30 taken along lines 2—2 of FIG. 1 wherein the outer diameter of inner tube 34 is sufficiently smaller than the inner diameter of outer tube 32 so that when tube 34 is concentrically disposed within tube 32, an annular passageway 40 is formed therebetween along the axial direction of the tubes. Heat exchanger 30 is provided with an offset strip fin 42 which is circumferentially disposed within annular passageway 40 and extends between inlet port 34 and outlet port 36. The ends of outer tube 32 and inner tube 36 are sealed together around the circumference of the tube ends at 35 thus sealing fin 42 therein, see FIG. 1.

For reasons which will become apparent later, fin 42, having dimensions falling within a prescribed range to be set out below, exhibits a significantly reduced pressure drop over conventional turbulizers and other offset strip fins and hence is referred to by the inventor as a low pressure drop (LPD) fin.

FIG. 3 shows a perspective view of a portion of fin 42 in its flat form while FIG. 4 is a front view of same. The portion of fin 42 shown in FIG. 3 comprises a plurality of [generally rectangular shaped] corrugations 44 diposed in transverse rows (or strips) shown at 46, 48, 50, 52 and 54. A complete fin such as would be found in heat exchanger 30 comprises a plurality of these rows extending in the axial direction when the fin is annularly disposed within passageway 40 as indicated by the arrows in FIG. 3. Corrugations 44 include a top [surface] portion 56, side portions 58 and bottom portions 60. Note that side portions 58 may be structurally referred to as fins and [hence] the overall structure is referred to as a fin. Corrugations 44 define apertures or flow passageways 62 opening in the axial direction. When a fluid such as oil is flowing through fin 42 it will periodically encounter leading edges 64 associated with corrugations 44.

Referring again to FIG. 3, corrugations 44 are characterized by the following dimensions; fin thickness T, corrugation or fin height H, corrugation width W and row width or lanced length L. The fin thickness T corresponds to the fin wall thickness against which the fluid impinges, or leading edge 64 as it flows axially through the rows of corrugations 44. Since all the corrugations have the same height, the fin height and the corrugation height are the same hence fin height and corrugation height refer to the same dimension.

The fin height H corresponds to the difference in the inner radius of outer tube 32 and the outer radius of inner tube 34 since top portion 56 and bottom portion 60 are in thermal contact with the inner surface of outer tube 32 and the outer surface of inner tube 34 respectively when heat exchanger 30 is fully assembled. Note that thermal contact between top portions 56 and bottom portions 60 with the respective portions of tubes 32 and 34 may be achieved in several ways including direct mechanical contact or by forming a metallurgical bond such as by brazing, the details of which will be determined by the particular material used in the construction of fin 42 and tubes 32 and 34.

The lanced length L, also referred to in the literature as the offset length, (the former will be used hereinafter to signify L in order to avoid confusion with the percent offset of the fin to be discussed below) is the length of sides 58 of corrugations 44 in the direction of fluid flow through fin 42 (as indicated in FIG. 3).

The corrugation width W refers to the width of the top and bottom portions of corrugations 44. Several different arrangements can occur and must be specified. First, the fin may be characterized by top and bottom portions having widths which are equal and thus the width refers to the width of both top part 56 and bottom part 60. Alternatively, the top and bottom portions could have different widths in which case both must be specified separately. In the present invention, top part 56 and bottom part 60 have the same width W.

The percent offset in the flat form refers to the offset in adjacent corrugations along both the top and bottom parts of the fin and is usually expressed as a percent. In the context of the present invention, since the top and bottom portions of the corruptions have the same widths, therefore in the flat form the offset refers to the offset between both top parts 56 and bottom parts 60. When the widths of the top and bottom portions are of unequal length, then the % offset must be specified for both the top and bottom parts of the fin. The amount of offset between corrugations 44 in fin 42 illustrated in FIGS. 3 and 4 is 50%, however, as will be discussed later the amount of this offset is not critical and may be more or less than 50%. The portions of the top and bottom parts of corrugations in adjacent rows which share a common boundary are joined at those positions, such as is shown at 63 in FIG. 3.

Figure 5:
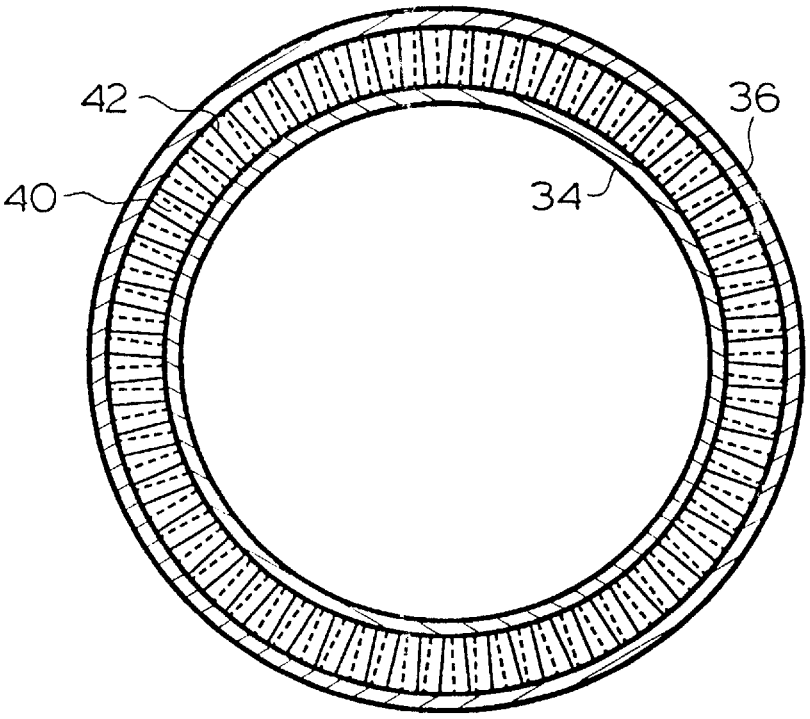
FIG. 5 is a sectional view of the wrapped fin of FIG. 4 showing the relative orientations of overlapping corrugations in two adjacent rows wherein the wrapped fin exhibits regular flow passages.
Figure 6:
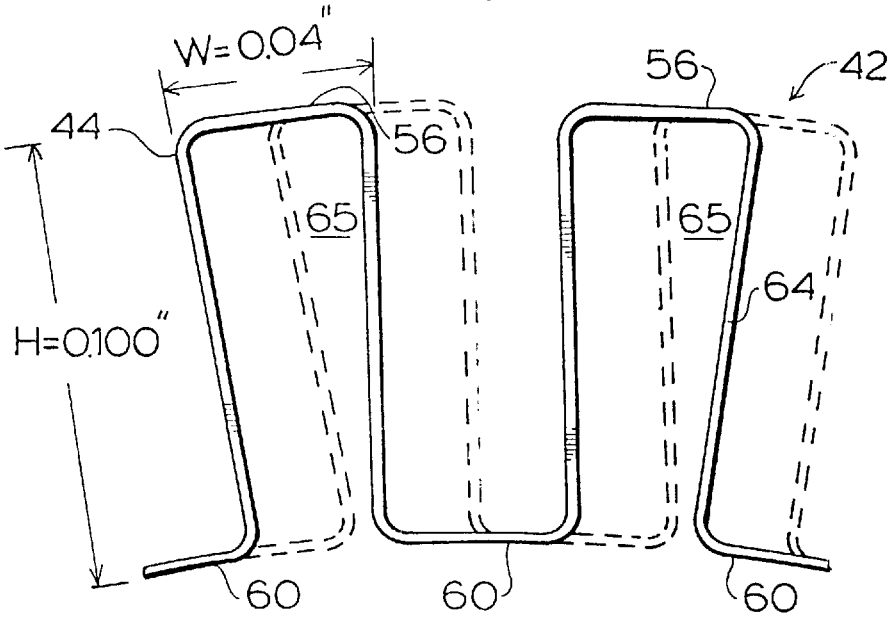
FIG. 6 is an enlarged view of the fin of FIG. 5 showing the relative orientations of overlapping corrugations in two adjacent rows or strips.

Referring to FIGS. 5 and 6, when fin 42 is placed within annular passageway 40, corrugations 44 become distorted from their original [rectangular] shape in the flat form. Overlapping portions of corrugations in adjacent rows form periodically interrupted fluid flow passages 65 in the axial direction. Due to the differences in circumferences of the inner surface of tube 32 and the outer surface of tube 34, the spacing between adjacent top parts 56 of adjacent corrugations 44 increases while the spacing between adjacent bottom portions 60 of corrugations 44 decreases, see FIG. 6. Once fin 42 is placed within passageway 40, corrugations 44 adopt a generally trapezoidal shape. Therefore, adjacent fluid flow passageways through the overlapping corrugations will have different shapes and cross-sectional area but will nevertheless be regular or periodic along the flow direction. This results in flow paths with differing resistances to flow which can, depending on the magnitude of the differences, lead to significant flow maldistribution and hence poor heat transfer.

Results of Studies To Determine The Optimum Range of Fin Dimensions For a 50% Offset Fin The inventor has carried out extensive and comprehensive studies to determine the preferred fin dimensions which give optimized heat transfer-to-pressure drop ratios for a wrapped fin wherein the flow passages are not all the some size or shape, see FIG. 6. The results of these studies are summarized herein.

In order to minimize the pressure drop along the axial direction and maximize heat transfer in the direction normal to the fluid flow direction, it is necessary to provide a fin geometry which on the one hand gives laminar flow through the flow passageways and maintains a thin oil boundary layer while also minimizing flow maldistribution. In addition, the fin will preferably have a high surface area to present to this thin oil boundary layer for efficient heat transfer. The high surface area is achieved by decreasing the cross-sectional dimensions of the flow passages in the direction in which heat is transferred from the oil to the fin, i.e. at right angles to the walls of the passageway.

Referring to FIG. 7a, the periodically interrupted passageway walls provide for better heat transfer by maintaining the developing boundary layer thin through the continual restarting of the boundary layers, shown at 66. In order to eliminate excessive form drag which occurs when the oil or fluid front impinges onto the leading edges of corrugations 44, the fin thickness T should be as thin as possible. For materials from which fins are typically fabricated such as alloys of copper, aluminum, brass, various steels and related alloys, the preferred thickness T for the fin has been determined to fall in the range from 0.002" to 0.004".

The regularity of the flow channels will be determined in large part by the relative relationship between the corrugation width W and the fin height H (see FIG. 3). At one extreme, highly irregular and unevenly spaced flow passages result when overlapping corrugations in adjacent rows cross over along the inner circumference. The attendant decrease in heat transfer performance in the presence of crossover is found to be quite significant. For the 50% offset strip fin it has been determined that in order to avoid crossover between corrugations in adjacent rows of the fin wrapped in the annular passageway, the fin height H should preferably be less than 0.130" while the corrugation width W should preferably be less then 0.050".

Figure 9:
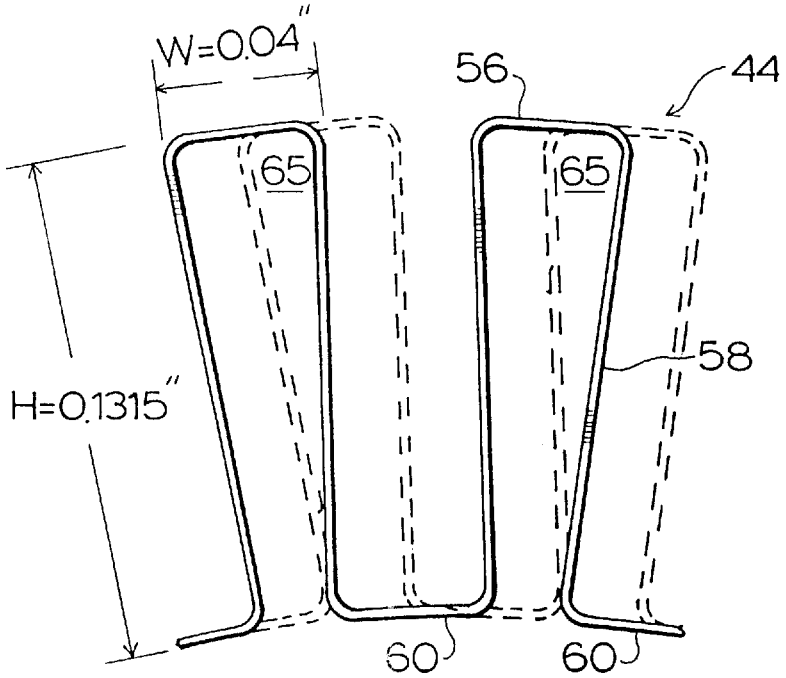
FIG. 9 is an enlarged view of the wrapped fin of FIG. 8 showing the relative orientations of overlapping corrugations in two adjacent rows at the limit of exhibiting crossover for the relative fin dimensions shown.
Figure 10:
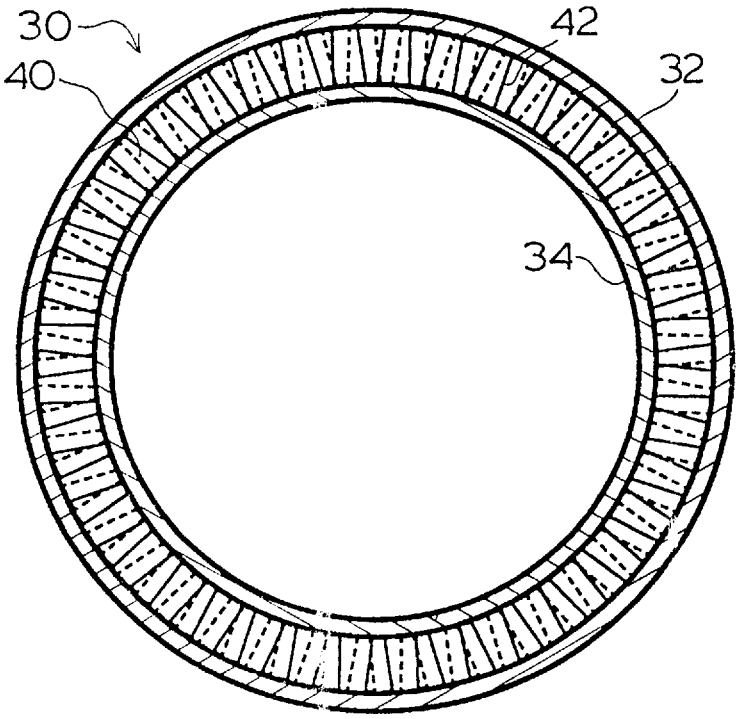
FIG. 10 is a sectional view of a wrapped fin exhibiting crossover.
Figure 11:
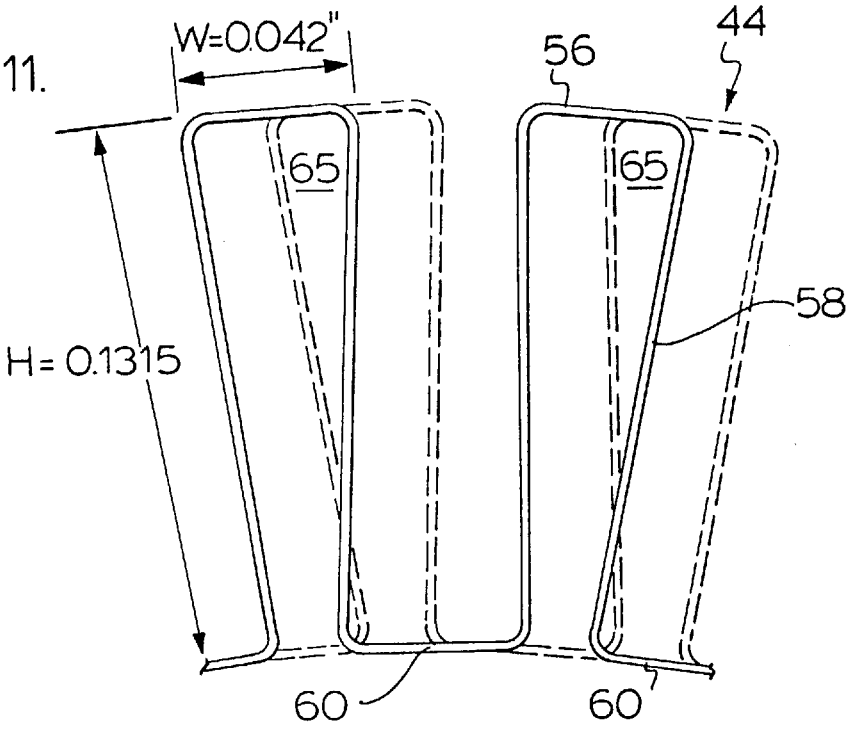
FIG. 11 is an enlarged view of the wrapped fin of FIG. 10 showing the relative orientations of overlapping corrugations in two adjacent rows exhibiting crossover for the relative fin dimensions shown.

Referring again to FIGS. 5 and 6, the fin illustrated therein is characterized by the regular flow passageways 65 since both H and W fall in the preferable ranges (note FIG. 6 is a scaled up [representations] *representation* of the fin). The fin of FIGS. 8 and 9 (scaled up) is on the verge of exhibiting crossover while the fin illustrated in FIGS. 10 and 11 (scaled up) clearly exhibits crossover, the fin having a height H slightly larger than the recommended upper limit of 0.130". A corrugation width W greater than 0.05" shows a tendency to cross over [, thus] . *Thus* this establishes the upper limit on the corrugation widths for fins with heights in the range 0.100" to 0.130".

Figure 12:
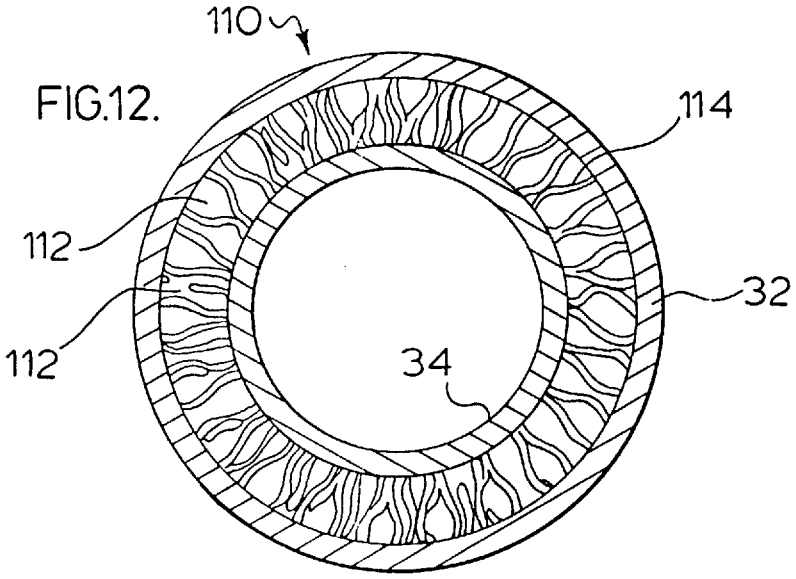
FIG. 12 is a cross-sectional view of a fin exhibiting highly unevenly spaced and irregularly shaped flow passages.

FIG. 12 illustrates a sectional view of a cooler 110 exhibiting extremely unevenly spaced and irregular flow passages 112 arising when a fin 114 is characteriized by a corrugation [widths] *width* W and height H which fall outside the prescribed ranges.

While the above established upper limits on fin height, thickness and corrugation width provide for fairly uniform flow distribution, in order to maximize the heat transfer and minimize the core pressure drop between the ends of the heat exchanger, the relative ranges for the corrugation width and lanced length must be determined.

Referring to FIG. 7b, it is well known that superior beat transfer coefficients are obtained in the entrance region 100 of rectangular flow passages 102 since they are characterized by developing hydrodynamic and thermal boundary layers shown at 104. The development of the offset strip fin is an attempt to exploit this effect. The hydrodynamic entry length may be approximated by $0.05*H_dR_e$, where $H_d$ is the hydraulic diameter and $R_e$ is the Reynolds number. This means that the ratio $L/H_d*R_e$ should not exceed 0.05 for hydrodynamically developing flow to exist. The Nusselt number $N_\mu$ is given by the expression $N_\mu=h*H_d/k$ where h is the convective heat transfer coefficient and k is the thermal conductivity of the fluid.

Recent theoretical studies have shown that for interrupted flow passages such as those produced with the OSF, see FIG. 7a, another type of fully developed flow, known as periodic flow, exists rather than pure hydrodynamically and thermally developing flow for lanced lengths in the hydrodynamically developing regime. This type of flow is characterized by velocity and temperature profiles which vary along each strip but are invariant from strip to strip at the same axial stations from the leading edge of the strip or corrugation. The mean laminar Nusselt numbers $N_\mu$ for periodic fully developed flow are significantly higher (2 to 5 times depending on the lanced length) than the corresponding Nusselt numbers for thermally and hydrodynamically developed flow. Periodic flow in a non-rectangular flow passageways may still give higher heat transfer coefficients compared to rectangular passageways with fully developed flow. This factor outweighs any deleterious effects of slight flow maldistribution arising in the non-rectangular flow passageways resulting when the fin is in the wrapped form.

That there will exist an optimum lanced length L for achieving both maximum heat transfer performance and a minimum pressure drop along the axial or longitudinal length of the heat exchanger can be understood for the following reasons. Maintaining the boundary layer thin results in better heat transfer due to a shorter heat conduction path. Thus, as the lanced length L is decreased the heat transfer coefficients will increase in the flow passages due to the continually decreasing heat conduction path length. For a given $R_e$, a reduction in $L/H_d$ results in an increase in the Nusselt numbers $N_\mu$ (and hence heat transfer coefficients h) for the periodic flow. However, the rate of increase in $N_\mu$ decreases as L decreases further and approaches an asymptotic value. Thus, there is no significant advantage to be gained by choosing L less than this minimum value since the heat transfer coefficient h has reached a limiting value. In fact, from the point of view of pressure drop, reducing the lanced length further may have a negative impact on the pressure drop in the axial direction. The dimensionless pressure drop $K_p$ is given by $$K_p=2\Delta P/\rho*v^2*t$$

where v is the flow velocity, ρ is the fluid density and ΔP is the pressure drop between the ends of the heat exchanger and t is the length of the heat exchanger between the ends of the heat exchanger. It has been observed that larger pressure drops are obtained at smaller $L/R_e*H_d$. Therefore, increasing the number of interruptions over the length of the heat exchanger results in an increase in pressure drop. Note that scarfed or bent edges of the corrugations as well as their finite thickness will also contribute to higher pressure drops, thus the fin fabrication technique may play a significant role in the overall pressure drop of the cooler.

The results of heat transfer studies to determine the preferable ranges for the corrugation width W and lanced length L will be graphically displayed by plotting Nusselt number $N_\mu$ versus L and W. 40

The results of pressure drop studies for the same range of corrugation width and lanced length will be graphically displayed by plotting the dimensionless pressure drop ΔP versus L and W.

Figure 13:
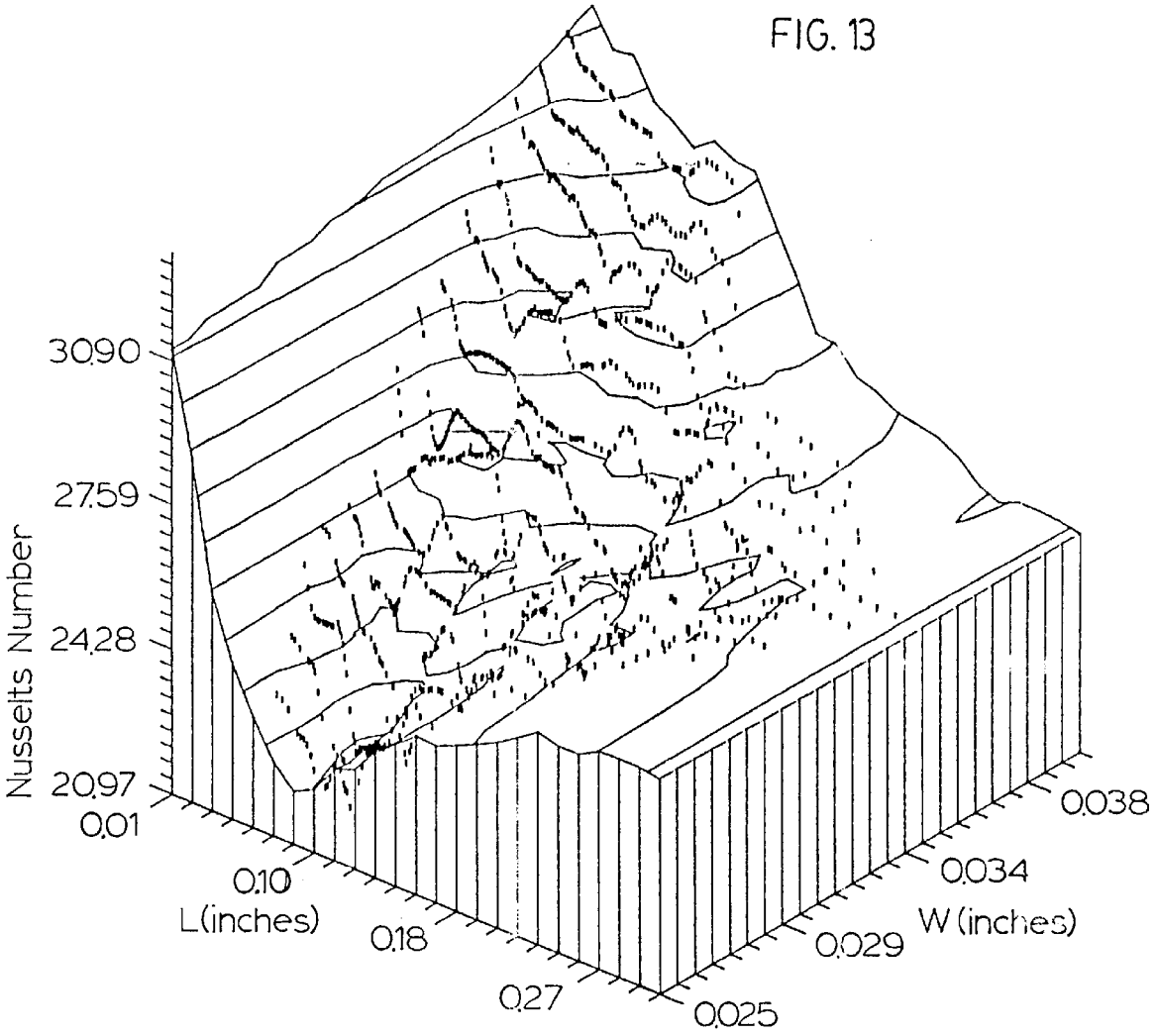
FIG. 13 is a three dimensional plot summarizing the heat transfer studies on concentric heat exchangers using the LPD fins of the present invention wherein a plurality of fins with corrugation widths in a range up to a maximum of W=0.050" and lanced lengths L in the range 0.010" to 0.270" have been studied.
Figure 14:
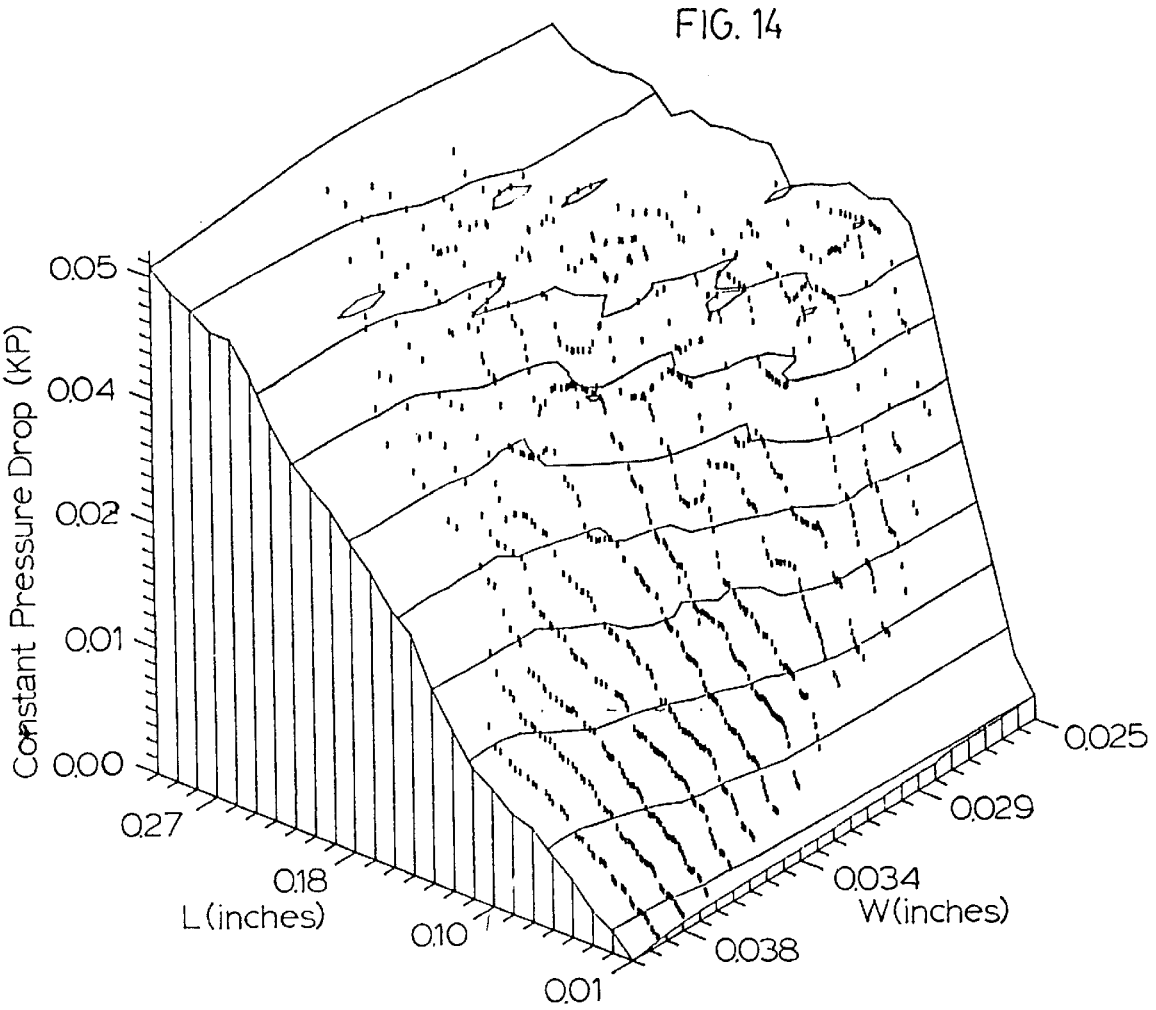
FIG. 14 is a three dimensional plot summarizing the pressure drop studies on concentric heat exchangers using various embodiments of the LPD fins (with H=0.105") of the present invention with corrugation widths varied in the range 0.026" to 0.050", and lanced lengths varied in the range 0.010" to 0.270"

FIG. 13 summarizes the results of heat transfer studies for a fin of height H=0.105" while FIG. 14 summarizes the corresponding pressure drop studies. It is clear that over the entire range of dimensionless pressure drop, $K_p$, the peak for heat transfer generally occurs in the range of lanced length from 0.035" to 0.075" and corrugation width maintained in the range 0.030" to 0.050".

Figure 15:
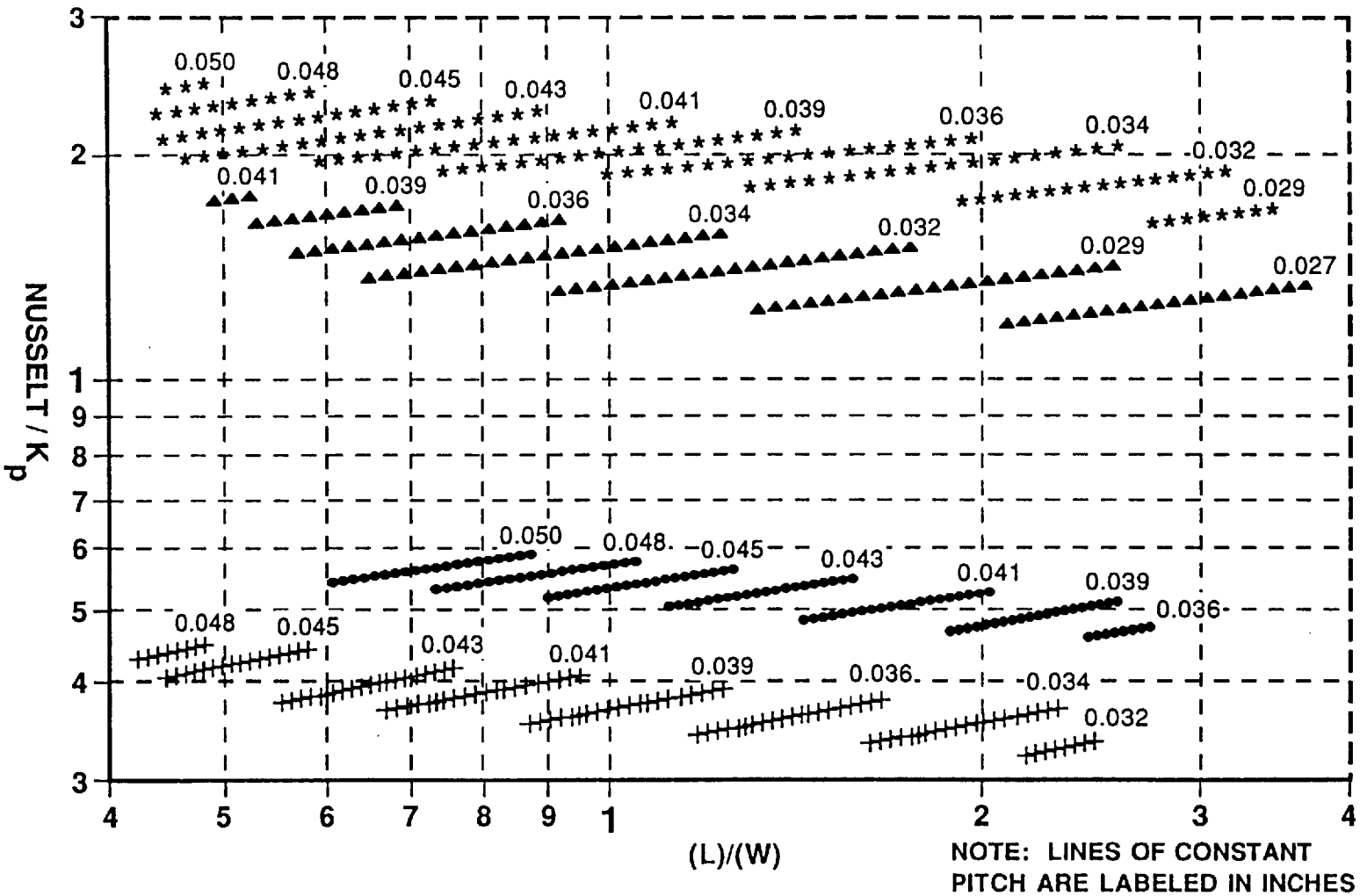
FIG. 15 summarizes the performance data of FIGS. 13 and 14 and similar data for LPD fins with H=0.130", indicating the optional ranges for corrugation width and lanced length where *=oil flow of 3 GPM; Fin H=0.105"; Δ=oil flow of 3 GPM; Fin H=0.13"

FIG. 15 graphically summarizes the data contained in the plots of FIG. 13 and 14 wherein the ratios of Nusselt numbers (hence heat transfer coefficients) to dimensionless pressure drop are plotted against the ratios of the lanced length to corrugation width for two different flow rates, 0.79 gpm and 3.0 gpm. FIG. 15 also summarizes data (not shown) similar to that displayed in FIGS. 13 and 14 but for a fin of height H=0.130" at the flow rates of 0.79 and 3.0 gpm. Therefore the optimum range for L has been determined for the reduced or downsized heat exchanger application.

The optimal ranges for the fin dimensions for a 50% OSF based on the above results of fluid properties, fin structure, heat transfer, and pressure drop studies are summarized in Table I below

TABLE I

| PARAMETER | RANGE FROM | RANGE TO |
|---|---|---|
| Fin height H | 0.100" | 0.130" |
| Lanced length L | 0.035" | 0.075" |

TABLE I-continued

| PARAMETER | RANGE FROM | RANGE TO |
|---|---|---|
| Corrugation width W | 0.027" | 0.050" |
| Fin thickness T | 0.002" | 0.004" |

Referring now to FIGS. 16–20, the heat transfer and pressure drop characteristics for the concentric tube heat exchanger utilizing the LPD fin of the present invention are plotted and compared to those for concentric heat exchangers employing conventional turbulizers. From these plots it is clear that the former exhibit heat transfer characteristics comparable to the [later] *latter* while exhibiting significantly lower pressure drops. Considering the differences in volume between coolers using the conventional turbulizers and those using the LPD fins in FIGS. 16 to 20, it is clear that the latter also exhibit comparable or better heat transfer performance-to-heat exchanger volume ratios than the former. The full advantage of the LPD fin of the present invention over the conventional turbulizer is clearly demonstrated in FIG. 20 where the dimensions of both heat exchangers are identical.

In light of the foregoing, a compact or downsized concentric heat exchanger utilizing an OSF fin has been disclosed which exhibits a pressure drop significantly lower than that observed with concentric coolers using conventional turbulizers. In addition, the heat transfer characteristics of the former are comparable to or better than those of the latter. This improvement in the operating characteristics of the downsized heat exchanger has been achieved by:

1) designing a fin with the appropriate fin height to corrugation width to decrease the cross-sectional area of the fluid flow passageways normal to the walls of the passageways in order to achieve both short heat conduction paths normal to the direction of fluid flow and to provide a large contact surface area between the passageway walls and the fluid flowing therethrough; while simultaneously 2) maintaining the corrugation width to fin height ratio in the appropriate range to ensure the regularity of the flow passage profile in order to reduce flow maldistribution; and 3) determining the preferable ranges for corrugation width and lanced length which result in hydrodynamically and thermally developing periodic flow in the flow passageways at a reduced pressure drop compared to that observed with conventional turbulizers.

It will be appreciated that the Determination of the preferable ranges for the lanced length L and the corrugation width W to produce the LPD fin was carried out on an offset strip fin with 50% offset with fin heights in the range between 0.100" to 0.130" and corrugation widths less than 0.050". As discussed above, OSFs with offsets greater or less than 50% will also be acceptable as long as the ranges of fin height H and corruption width W are such that regular flow channels are achieved. Specifically, as long as the dimensions H and W are such that when the fin is disposed within the annular passageway no crossover occurs, deviations from 50% overlap are acceptable. FIG. 21 illustrates a blowup of a partial sectional view of a wrapped fin 120 characterized by an offset less than 50% while FIG. 22 shows a partial wrapped fin 130 with an offset greater than 50%. In both cases regular flow passages 122 and 132 ar achieved in the wrapped form. Thus while the preferable ranges for L and W for an OSF with greater or less than 50% offset are not specifically disclosed herein, it will be understood that the inventor considers as part of the scope of the subject invention all compact heat exchangers employing fins with offsets in the vicinity or 50% which have been optimized with respect to the pressure drop and heat transfer to produce the LPD fin.

FIG. 23 illustrates another alternative embodiment of the fin of the subject invention comprising an offset strip fin 150 with a constant offset Q between the edges of corrugations 44' in adjacent rows The constraint on the dimension Q will be that no crossover occurs when fin 150 is in the wrapped form.

As mentioned above, the finite fin thickness and the presence of any scarfing or bent edges will result in generally higher pressure drops. Thus it is desirable to have the thinnest fin possible.

While the optimized LPD fin dimensions have been determined for a concentric tubular heat exchanger for automotive applications, it will be readily apparent to those skilled in the art that the LPD fin disclosed herein may be readily adapted for use in other heat exchanger geometries. FIG. 24 shows a flat parallel plate heat exchanger at 170 comprising two plates 172 and 174 provided with an LPD fin 176 sandwiched therebetween. Note the fact that in this particular geometry the flat form of the LPD fin implies that the constraint on fin height H and corrugation width W required to avoid crossover when in the wrapped form may be relaxed. Therefore fins with percent offsets ranging over a wider range than is possible when used in the wrapped form may be utilized. It will be understood that flat plate heat exchangers using the LPD fin of the subject invention have other structural requirements which must be satisfied in order to produce an efficient heat exchanger. For example, for flat plate coolers of a width generally greater than 1.5", the inlet and outlet ports must be such to provide rapid transverse oil flow across the full width of the cooler in order to utilize the full internal area of the heat exchanger. This may be accomplished in various ways including having transversely elongate inlet and outlet ports extending substantially across the transverse width of the cooler. Alternatively, the fin may be provided with a region adjacent the inlet and outlet ports which are specifically structured to provide rapid transverse flow. Such modifications will generally not be required for coolers of width less 1.5".

Similarly, a rectangularly shaped heat exchanger having rounded edges may be used instead of a concentric tube heat exchanger with the fin dimensioned so as to avoid crossover in the corner regions.

In summary, an offset strip fin having a range of dimensions suitable for cooling of automotive based oils in compact heat exchangers has been disclosed. The preferred ranges of fin height, corrugation width, thickness and lanced length for a 50% OSF have been determined for automotive applications of the heat exchanger e.g. using typical transmission and transaxle oil at typical oil flow rates in a concentric tube heat exchanger geometry. Fins with offsets different from 50% may be readily used in the coolers with the fin dimensions being determined by the geometry of the cooler and wherein studies similar to those reported above can be carried out to determine the preferred fin height and corrugation width. Similarly, the heat exchangers and fin structures or the present invention may be utilized for cooling other liquids besides fluids associated with the automotive industry. In this case the preferred range or lanced lengths can be determined using the liquids to be cooled in the range of anticipated flow rates.

Therefore, while the present invention has been described and illustrated with respect to the preferred and alternative embodiments, it will be appreciated that numerous variations of these embodiments may be made without departing from the scope of the invention, which is defined in the appended claims.

I claim:

[1. An offset strip fin for use in a heat exchanger, comprising:

a) a plurality of transverse rows of corrugations, the rows being adjacent and extending in an axial direction, the corrugations having a substantially flat top portion and a flat bottom portion, the top and bottom portions or the corrugations having the same width, the corrugations having a height in a predetermined range, the corrugations having a width in a predetermined range, wherein said height of the corrugation is greater than said width; and b) the corrugations in adjacent rows of the fin overlapping and interconnected between said flat top and flat bottom portions, the overlapping corrugations defining periodically interrupted now passageways in the axial direction, and wherein the corrugations each have a lanced length in the axial direction in a predetermined range.]

[2. An offset strip fin according to claim 1 wherein the cross-sectional area of the apertures through the corrugations in the fluid flow direction is small compared to the surface area of the corrugations in order to provide short heat conducting paths and a large contact surface area between the corrugations and the fluid flowing therethrough.]

[3. A parallel plate heat exchanger, comprising:

a) a generally rectangular metal container defining a longitudinal direction, the container having parallel top and bottom plates, means defining an entrance port located adjacent one end or the container and means defining an outlet port located adjacent the opposed end or the container; and b) an offset strip fin disposed between the top and bottom plates, the fin being provided with a plurality of transverse rows of corrugations, the rows being adjacent and extending in the longitudinal direction, the corrugations having flat top portions and flat bottom portions, the top and bottom portions of the corrugations having the same width, the top portions being in thermal contact with the top plate and the bottom portions being in thermal contact with the bottom plate, each corrugation having parallel side walls, the corrugations having a height in a predetermined range, the corrugations having a width in a predetermined range, wherein said height of the corrugations is greater than said width, the corrugations in adjacent rows of the fin overlapping, the overlapping corrugations defining periodically interrupted now passageways in the longitudinal direction characterized by laminar fluid flow therethrough, and wherein the corrugations have a lanced length in the longitudinal direction in a predetermined range suitable to give fully developed periodic flow in the longitudinal direction.]

[4. The heat exchanger according to claim 3 wherein the cross-sectional area of the apertures through the corrugations in the flow direction is small compared to the surface area of the corrugations in order to provide a short heat conducting path and a large contact surface area between the corrugations and the fluid flowing therethrough.]

[5. A heat exchanger according to claim 3 wherein the lance lengths are in the range suitable to give periodic fully developed flow when the liquid being cooled is flowing therethrough.]

[6. A heat exchanger according to claim 3 including a transversely elongate inlet port located adjacent one end of the container and a transversely elongate outlet port located adjacent the opposed end of the container.]

7. A *single pass* tubular heat exchanger for cooling [transaxle and transmission] oil, comprising:

a) an outer tube *having a circular cross-section*;

b) an inner tube *with circular cross-section* disposed within the outer tube with the space between the inner tube and the outer tube defining [a] *an elongate substantially straight* passageway extending along the axial direction of the tubes, *said passageway having two opposite ends*;

c) an inlet port in flow communication with the passageway for admitting fluid to be cooled into the passageway, *said inlet port being located at one end of said passageway*;

d) an outlet port in flow communication with the passageway for providing a fluid outlet from the passageway, wherein the outlet port is spaced from the inlet port *and located at the opposite end of said passageway,* ; and e) an offset strip fin disposed in the passageway between the inlet and outlet ports, wherein the fin is provided with a plurality of transverse rows of corrugations, the rows being adjacent and extending in the axial direction, the corrugations each having a [substantially flat] top portion and a [flat] bottom portion, the top and bottom portions of the corrugations having the same width, the top portion being in thermal contact with the inner surface of the outer tube and the bottom portion being in thermal contact with the outer surface of the inner tube, the corrugations *also* having *radially extending portions which join the top and bottom portions and which have* a height in a predetermined range *from substantially 0.1 inch to 0.130 inch*, said corrugation width being in a predetermined range, wherein said height of the corrugations is greater than said width, the corrugations in adjacent rows of the fin overlapping [and] *but not to the point where said radially extending portions of one row crossover those of adjacent rows when viewed from one end of said passageway, said corrugations being* interconnected between said [flat] top and [flat] bottom portions, the overlapping corrugations defining periodically interrupted flow passageways in the axial direction, and wherein the corrugations have a lanced length in the longitudinal direction in a predetermined range.

[8. A heat exchanger according to claim 7 wherein the inlet port is located adjacent one end of the tubes and the outlet port is located adjacent the other end of the tubes.]

9. The tubular heat exchanger according to claim 7 wherein the tubes have a circular cross-section, wherein the passageway between the tubes is an annular passageway, wherein disposing the fin within the passageway results in the top portions of adjacent corrugations being separated by a distance greater than the width of the corrugations and the bottom portions of adjacent corrugations being separated by a distance which is less than the width of the corrugations.

10. The heat exchanger according to claim 9 wherein the fin is fabricated of an alloy from the class of alloys containing brass, various steel alloys and various aluminum alloys.

11. The heat exchanger according to claim 10 wherein the fin thickness is in the range from substantially 0.002" to 0.004".

[12. The heat exchanger according to claim 11 wherein the fin height is in the range from substantially 0.100" to 0.130".]

13. The heat exchanger according to claim [12] *7* wherein the width of the corrugations is in the range from substantially 0.027" to 0.050".

14. The heat exchanger according to claim 13 wherein the lanced length is in the range from substantially 0.035" to 0.075".

15. A concentric tube heat exchanger for cooling automotive transaxle and transmission oil at oil flow rates in the range from substantially 0.50 gpm to 3.5 gpm, comprising:

a) an outer tube having an inner diameter;

b) an inner tube having an outer diameter less than the inner diameter of the outer tube, the inner tube being concentrically disposed within the outer tube with the space between the inner tube and the outer tube defining an annular passageway extending along the axial direction of the tubes, and the concentric tubes being sealed together at the ends of the tubes;

c) the outer and inner tubes defining an inlet port in flow communication with the annular passageway for admitting fluid to be cooled into the passageway, and an outlet port in flow communication with the annular passageway for providing a fluid outlet from the passageway, wherein the outlet port is spaced from the inlet port *and said inlet and outlet ports are located at opposite ends of said tubes*; and d) an offset strip fin circumferentially disposed in the annular passageway extending axially between the ends of the tubes, wherein the fin comprises transverse rows of corrugations, the corrugations defining flow passageways in the axial direction, the corrugations having *radially extending portions with* a height substantially equal to the difference between the inner radius of the outer tube and the outer radius of the inner tube *and in a range from substantially 0.1 inch to 0.130 inch*, the corrugations having a [flat] top portion in thermal contact with the inner surface of the outer tube and a [flat] bottom portion in thermal contact with the outer surface of the inner tube, the top and bottom portions of the corrugations having the same width, the width being in a predetermined range *and less than said height of the corrugations*, wherein the top portions of transversely adjacent corrugations are separated by a distance greater than the width of the corrugations and the bottom portions of transversely adjacent corrugations are separated by a distance which is less than the width of the corrugations, *the corrugations in adjacent rows of the fin overlapping but not to the point where said radially extending portions of one row cross over those of adjacent rows when viewed from one end of said passageway,* and the corrugations having a lanced length in the axial direction in a predetermined range.

[16. A heat exchanger according to claim 15 wherein the inlet port is located adjacent one end of the tubes and the outlet port is located adjacent the other end of the tubes.]

17. The heat exchanger according to claim 15 wherein the cross-sectional area of the apertures through the corrugations in the flow direction is small compared to the surface area of the corrugations in order to provide a short heat conducting path and a large contact surface area between the corrugations and the fluid flowing therethrough.

[18. The heat exchanger according to claim 15 wherein the fin height is in the range from substantially 0.100" to 0.130".]

19. The concentric heat exchanger according to claim [18] *15* wherein the width of the corrugations is in the range from substantially 0.027" to 0.050".

20. The heat exchanger according to claim 19 wherein the lanced length is in the range from substantially 0.035" to 0.075".

21. The heat exchanger according to claim 20 wherein the fin is fabricated of an alloy from the class of alloys containing brass, various steel alloys and various aluminum alloys.

*22. A tubular heat exchanger according to claim 7 wherein said top and bottom portions of the corrugations are substantially flat.*

*23. A concentric tube heat exchanger according to claim 15 wherein said top and bottom portions of the corrugations are flat.*

*24. A tubular heat exchanger according to claim 7 wherein said top and bottom portions of the corrugations are substantially flat.*

*25. A concentric tube heat exchanger according to claim 15 wherein said top and bottom portions of the corregation are flat.*

* * * * *